(No Model.)
C. W. LEVALLEY.
HARVESTER.
No. 245,182. Patented Aug. 2, 1881.
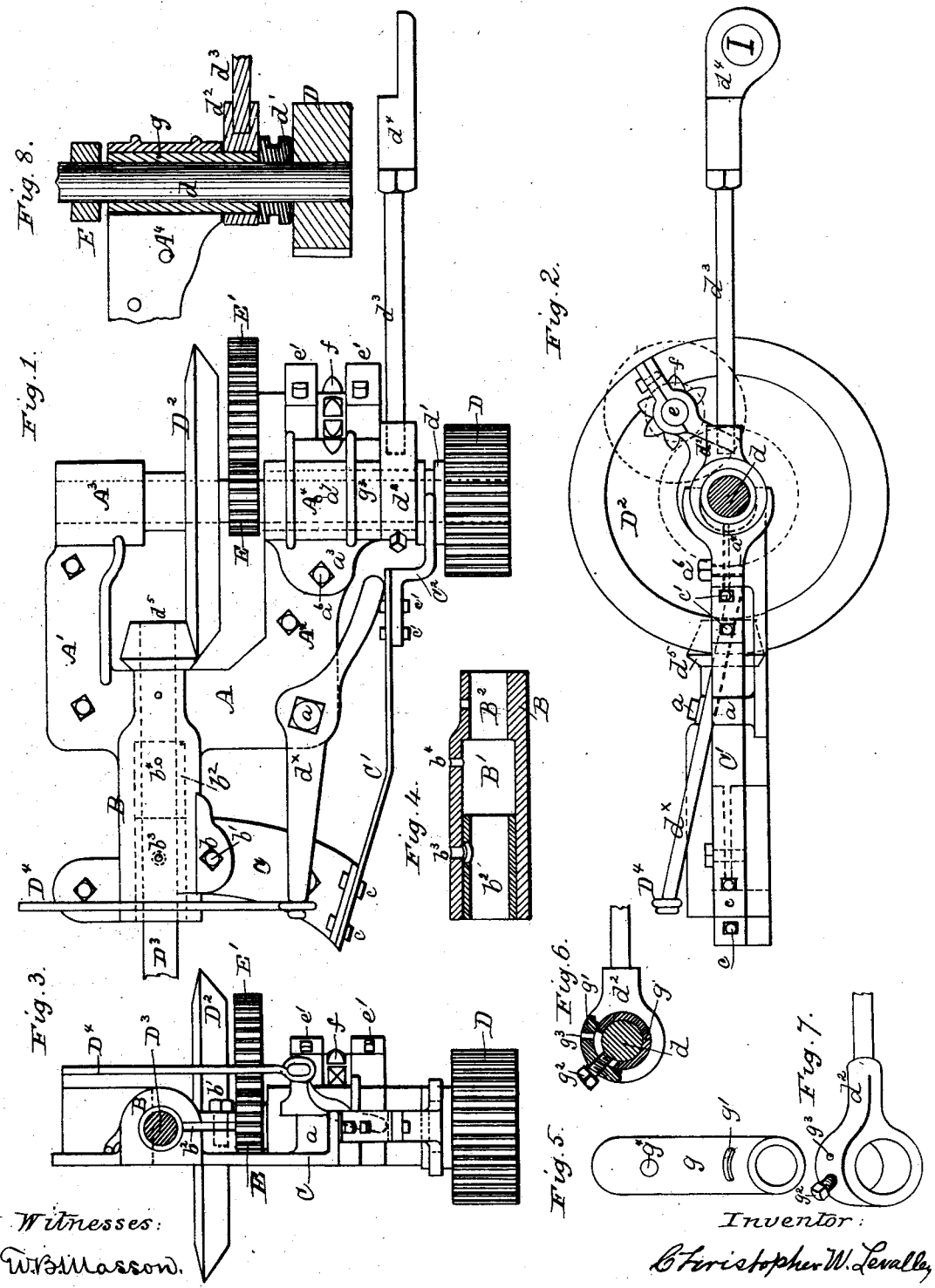
Witnesses:
W. B. Masson.
J. S. Barker.
Inventor:
Christopher W. Levalley,
by Doubleday and Bliss
attys

UNITED STATES PATENT OFFICE.

CHRISTOPHER W. LEVALLEY, OF ST. PAUL, MINNESOTA, ASSIGNOR TO THE ST. PAUL HARVESTER WORKS, OF SAME PLACE.

HARVESTER.

SPECIFICATION forming part of Letters Patent No. 245,182, dated August 2, 1881.

Application filed May 21, 1881. (No model.)

*To all whom it may concern:*

Be it known that I, CHRISTOPHER W. LEVALLEY, a citizen of the United States of America, residing at St. Paul, in the county of Ramsey and State of Minnesota, have invented certain new and useful Improvements in Harvesters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a plan or top view of so much of a harvester as is necessary to show my invention. Fig. 2 is a side elevation, partly in section. Fig. 3 is a front view, the projecting end of a pitman-shaft being in section. Figs. 4, 5, 6, and 7 are detached views, showing details of construction; and Fig. 8 is a horizontal section of the pinion-shaft, its bearing, and the devices which are mounted upon it, the inner end of the shaft being broken away.

A A' A² represent a cast-metal base-plate adapted to be secured to the main frame or gear-plank of a harvester, and provided at one side with a tubular bearing, B, adapted to receive the crank-shaft, and upon the opposite side with bearings A³ A⁴, adapted to receive and support the secondary shaft or pinion-shaft $d$, which is mounted upon it, and pinion D, adapted to mesh with and be driven by the main driving-wheel of a harvester constructed in substantial accordance with my Patent No. 241,498, dated May 17, 1881.

The tubular crank-shaft box or bearing is constructed with a longitudinal slit or throat, $b^2$, and is provided upon one side with a lip, $b$, projecting from above the slit, and a bolt or clamping set-screw, $b'$, which passes through the lip and takes into an arm, C, which projects horizontally from the sleeve below the slit.

The portion $B^2$ of the sleeve is bored out, of such diameter as to fit closely the crank-shaft, the portion B' being of greater diameter, and the lining or bushing is made of such external diameter as to fit closely within the larger diameter of the sleeve, and of such internal diameter as to fit closely the crank-shaft $D^3$, but is shorter than the part B, whereby, when the parts are in proper working position, an oil-chamber is formed within the sleeve to receive oil through the opening $b^4$, the bushing and sleeve having a continuous oil-hole, $b^3$.

It will be seen that, by reason of the slot $b^2$ and the bolt $b'$, I can gripe the bushing and hold it firmly in place, and can take out the bushing and replace it at will by simply removing the crank-wheel from that end of the crank-shaft which projects beyond the bushing, and without the necessity of withdrawing the crank-shaft from the tubular bearing B.

The pinion-shaft bearing $A^4$ is constructed with a similar slit or throat, (shown in dotted lines at $a^4$, Fig. 2,) the upper part of the bearing having projecting flange $a^3$, through which a bolt or clamping set-screw, $a^6$, passes into the part $A^2$ of the bed-plate. The internal diameter of the bearing $A^4$ is of greater diameter than the shaft $d$, and there is a bushing, $g$, Fig. 5, inserted within the bearing, it being of greater length than said bearing, for a purpose which will soon be explained. This bushing has a slot, $g'$, and an oil-hole, $g^4$, which corresponds in position to the oil-hole $a^7$ in the bearing. When preferred, the bearing $A^3$ may be provided with a similar bushing.

$d^3$ is a link provided at one end with a loop or eye, $d^4$, which surrounds the main axle at I, Fig. 2, and is screw-threaded at its opposite end, where it enters a screw-threaded socket in the neck of a head, $d^2$, which has an opening of sufficient size to slip over that end of the bushing $g$ which projects beyond the bearing $A^4$, the relation of the bearing $A^4$, the bushing $g$, the shaft I, the link and loop I² I³, and the clutch I' to each other being clearly shown in Fig. 8.

$g^2$ is a set-screw passing through the head $d^2$ and entering the slot $g'$ in the bushing, the position of the set-screw relative to the oil-hole $g^3$ being such that when the set-screw is in the end (see Fig. 6) of the slot $g'$ the oil-hole $g^4$ will register with the oil-hole $a^7$, the link $d^3$ being in position to have the loop $d^4$ surround the axle.

$f$ is a sprocket-wheel mounted on a shaft, $e$, which is mounted in bearings $e'$ $e'$, the lower parts of which are cast, by preference, in one piece with the bearing $A^4$.

$E'$ is a spur-gear mounted on shaft $e$ and driven by spur-gear $E$ on shaft $d$.

$D^2$ is a bevel-gear mounted on shaft $d$ and driving a bevel-pinion, $d^5$, on crank-shaft. $d'$ is a clutch feathered to shaft $d$, and sliding thereon to connect the said shaft with pinion D.

$C^2$ is a fork mounted on the end of a spring, $C'$, which is attached to one end of the arm C by means of bolts $c$ $c$, the ends of the fork entering a groove in the clutch.

$d^x$ is a shipping-lever pivoted upon a stud, $a$, rising from the bed-plate.

$D^4$ is a link connected at one end with the shipping-lever and extending to a point within convenient reach of the driver.

The link $d^3$ is intended to be employed for the purpose of regulating the depth of mesh between the pinion D and its driving-gear, as is explained in my patent above referred to, and the operation of the other parts of the mechanism will be readily understood from an examination of the drawings and the foregoing description, without further explanation.

It will be seen that each of the bushings can be removed from their respective boxes without removing the driving-shafts, which they surround, by simply taking off the crank-wheel from the crank-shaft, or by taking off the pinion D and clutch $C^2$ from shaft $d'$, as the case may be.

It will also be seen that by reason of the set-screw $g^2$ entering the slot $g'$ the head $d^2$ is maintained in close contact with the bearing $A^4$, irrespective of the position of the sliding clutch $C^2$.

I do not, in this application, claim, broadly, a tubular sleeve or bearing provided upon one side with a slit, whereby the bearing is adapted to be contracted slightly by means of a set-screw or bolt, being aware that such construction is not new with me; but I believe I am the first to combine with such slitted bearing a removable bushing, whereby certain advantages are secured, it being apparent that the bushing can be readily removed and replaced by a new one whenever its interior surface shall have been worn by the shaft to such an extent as shall make it desirable to thus replace it. Thus all wear upon the inner surface of the tubular bearing is avoided.

It is also apparent that some of the advantages may be derived from my invention without the employment of the clamping set-screws or bolts to clamp the upper and lower part of the tubular sleeve upon the bushing, because rotation of the bushing within the sleeve may be prevented by the set-screw $g^2$, which enters the slot $g'$, even though the friction of the outer surface of the bushing upon the inner surface of the sleeve be not sufficient for that purpose; but under many circumstances such friction will suffice to hold the sleeve in proper position by reason of the elasticity of the sleeve. I ordinarily prefer to use clamping set-screws or bolts, in order to facilitate the introduction and removal of the bushing within the sleeve.

What I claim is—

1. In a harvester, the removable bushing adapted for a shaft-bearing, in combination with a tubular bearing or sleeve provided with a slit in one side, and means adapted to clamp the bearing upon the bushing, substantially as set forth.

2. In a harvester, the bearing $A^4$, provided with a slit, $a^4$, in combination with the bushing $g$, slotted as at $g'$, the set-screw $g^2$, the link $d^3$, and head $d^2$ mounted upon the bushing, substantially as set forth.

3. In a harvester, the combination of the bearing $A^4$, slitted upon one side, the clamping-screw $a^6$, the slotted bushing $g$, the link $d^3$, the head $d^2$, and set-screw $g^2$, substantially as set forth.

4. In a harvester, the bed-plate and the tubular bearing B, cast in one piece and provided with the projecting arm C, in combination with the clutch, the shipping-lever, and the spring $C'$ secured to the projecting arm C, substantially as set forth.

In testimony whereof I affix my signature in presence of two witnesses.

CHRISTOPHER W. LEVALLEY.

Witnesses:
J. H. RANDALL,
E. M. DEANE.